(12) United States Patent
Yasui

(10) Patent No.: US 6,618,058 B1
(45) Date of Patent: Sep. 9, 2003

(54) EDITING DEVICE AND EDITING METHOD

(75) Inventor: Shigeya Yasui, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/587,438

(22) Filed: Jun. 5, 2000

(30) Foreign Application Priority Data

Jun. 7, 1999 (JP) .................................. P11-159752

(51) Int. Cl.⁷ ................................................ G09G 5/00
(52) U.S. Cl. ....................................................... 345/723
(58) Field of Search ................................ 345/723, 726; 348/722, 239, 423.1

(56) References Cited

U.S. PATENT DOCUMENTS

| | | | | |
|---|---|---|---|---|
| 5,339,393 A | * | 8/1994 | Duffy et al. | 345/723 |
| 5,519,828 A | * | 5/1996 | Rayner | 345/723 |
| 5,613,909 A | * | 3/1997 | Stelovsky | 434/307 A |
| 5,732,184 A | * | 3/1998 | Chao et al. | 345/723 |
| 5,760,767 A | * | 6/1998 | Shore et al. | 345/723 |
| 5,781,188 A | * | 7/1998 | Amiot et al. | 345/723 |
| 5,786,814 A | * | 7/1998 | Moran et al. | 345/720 |
| 5,889,519 A | * | 3/1999 | Boezeman et al. | 345/723 |
| 5,892,507 A | * | 4/1999 | Moorby et al. | 345/723 |
| 5,956,453 A | * | 9/1999 | Yaegashi et al. | 386/111 |
| 5,999,173 A | * | 12/1999 | Ubillos | 345/724 |
| 6,064,379 A | * | 5/2000 | DeMoney | 345/723 |
| 6,204,840 B1 | * | 3/2001 | Petelycky et al. | 345/723 |
| 6,353,461 B1 | * | 3/2002 | Shore et al. | 345/723 |
| 6,414,686 B1 | * | 7/2002 | Protheroe et al. | 345/474 |

* cited by examiner

*Primary Examiner*—Sy D. Luu
(74) *Attorney, Agent, or Firm*—Frommer Lawrence & Haug LLP; William S. Frommer; Darren M. Simon

(57) ABSTRACT

An editing device and an editing method which greatly improve the efficiency of editing work. The editing device includes first displaying means for displaying a plurality of images by converting the images to time lines on the basis of time codes added in synchronicity with respective images on an identical time base respectively, second displaying means for displaying images corresponding to the time codes designated on the time bases among the respective time lines, and the third displaying means for displaying an image of a desired part sequentially designated, on the time bases, from the respective images, as a clip respectively. The editing method is configured by displaying a plurality of images by converting the images to time lines on the basis of a time codes added respectively in synchronicity with an identical time base, by displaying the images corresponding to the time codes designated on the time bases among the respective time lines, and by displaying an image of a desired part sequentially designated, on the time bases, from the respective images, as a clip respectively.

6 Claims, 7 Drawing Sheets

EDITING DEVICE AND EDITING METHOD

BACKGROUND OF THE INVENTION

1. Field of the Invention

The present invention relates to an editing device and an editing method; and more particularly, is suitably applied to an editing system by which respective images of one imaging object, which are imaged from various angles by using a plurality of video cameras, can be edited.

2. Description of the Related Art

So far, as this kind of editing system, there is one configured by an editing device and a video server; the editing device registers images designated sequentially by an operator from image data stored in the video server, as clips, respectively, prepares sequence of the respective clips registered and an editing list designating an editing content such as joining manner, and carries out so-called non-linear editing by controlling the video server on the basis of the editing list.

Meanwhile, according to the editing system, image data as the imaging result of imaging based on a proper time code by using such as a video camera is recorded by the video server together with given text data accompanied with the image data after a given input processing operation.

Therefore, for example, when one imaging object is imaged from various angles by using a plurality of above-mentioned video cameras, those respective images imaged are imaged based on separate time codes, respectively.

However, there was the following problem in such an editing system that it was difficult to understand temporal correlation among respective images due to desynchronized time sequence of those respective images for editing respective images imaged for one imaging object with respective video cameras by such way.

Therefore, for example, in the case where the imaging object was a series of scenes such as a car race or the like, it was difficult to understand which portion of which scene was the image of a clip selected from respective image data, and this posed a problem that adjusting temporal timing between the clips was difficult.

Further, there is such a problem in preparing an editing list by this editing system that a juncture between clips becomes unclear, because of displaying by jointing selected clips to form a series of time lines on the time base.

SUMMARY OF THE INVENTION

In view of the foregoing, an object of the present invention is to provide an editing device and an editing method for allowing a great improvement of efficiency of editing work.

The foregoing object and other objects of the invention have been achieved by the provision of an editing device which comprises first displaying means for displaying respective images based on a plurality of imaging results by converting the images to time lines on the basis of time codes added in synchronicity with respective images on an identical time base respectively, second displaying means for displaying respective images corresponding to time codes designated by the time bases among the respective time lines displayed by the first displaying means, third displaying means for displaying an image of a desired part sequentially designated, on the time bases, from the respective image displayed by second displaying means, as a clip respectively, in which the third displaying means selects only the desired clip from clips corresponding to the respective imaging results configuring the desired parts designated.

As a result, according to this editing device, temporal correlation between clips extracted from each image of the desired part, which is sequentially designated on the time base, from respective images can be easily understood.

The editing method according to the present invention has a first step of displaying respective images based on a plurality of imaging results by converting the images to time lines on the basis of time codes added in synchronicity with respective images on an identical time base respectively, a second step of displaying respective images corresponding to time codes designated by the time bases among the respective time lines displayed, a third step of displaying images of a desired part sequentially designated, on the time bases, from the respective displayed images as clips respectively, and a fourth step displaying only a clip selected from clips corresponding to the respective imaging results composing the designated desired parts.

As a result, according to the editing method, temporal correlation between clips extracted from each image of the desired part, which is sequentially designated on the time base, from respective images can be easily understood.

The nature, principle and utility of the invention will become more apparent from the following deraiked description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Configuration of an Editing System According to the Present Embodiment

Figure 1:
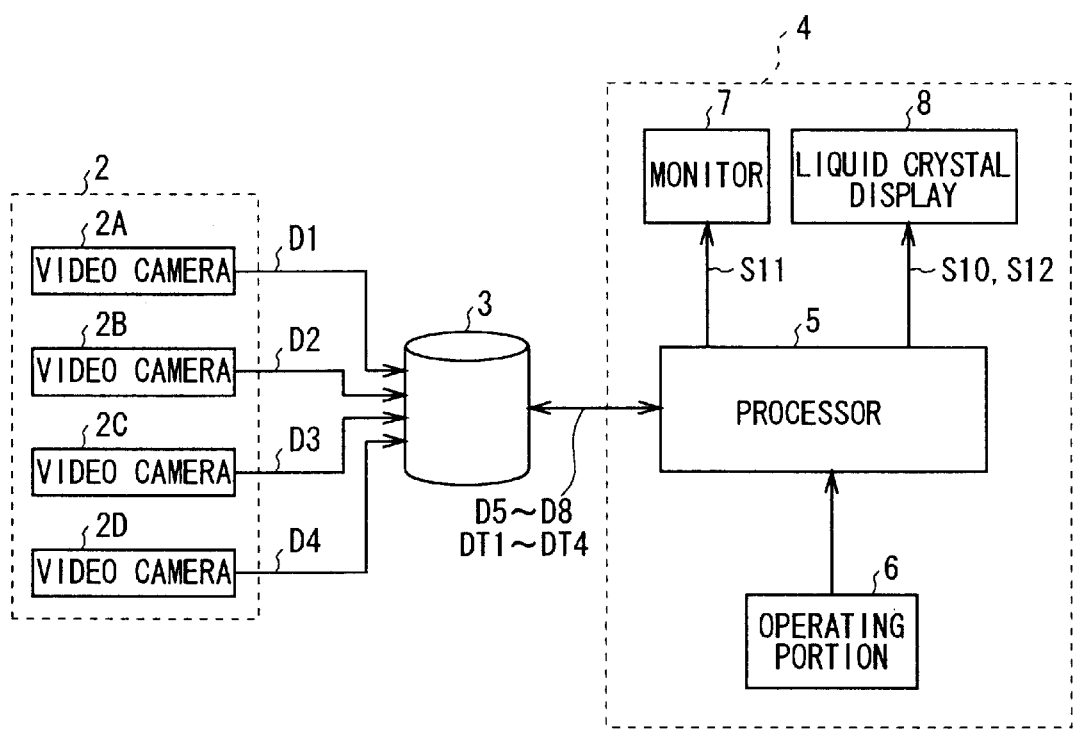
FIG. 1 is a block diagram showing an overall configuration of an editing system according to this embodiment.

In FIG. 1, reference numeral 1 denotes an overall editing system according to the embodiment of the present invention as a whole: a plurality of video cameras 2A to 2D of the imaging device 2 compresses and encodes respective image data D1 to D4 prepared by imaging one imaging object from various angles respectively on the basis of such standard as moving picture experts group phase 2 (MPEG 2) and these are stored as encoded data D5 to D8 in the video server 3 comprising an audio video (AV) server having a recording and replaying parts of a disk array configuration.

In this step, the video server 3 receives text information, such as the titles, IDs, interview data, and interview places of respective image data D1 to D4 inputted from a text data-inputting part, not illustrated, by an operator, as text data DT1 to DT4. Through this step, the video server 3 makes sequentially the text data DT1 to DT4 of these image data DI to D4 to data base to store them.

Next, the encoded data D5 to D8 of respective image data D1 to D4 stored in the video server 3 and corresponding text data DT1 to DT4 can be read by the operator as needed by using a processor 5 of the editing device 4.

In practice, in a data searching and selection mode, when search criteria for IDs of the image data D1 to D4 or the like that are desired by the operator are inputted to an operating portion 6 and a searching instruction for the image data D1 to D4 is inputted, the processor 5 searches corresponding image data D1 to D4 based on the data base of the text information of respective image data D1 to D4 stored in the video server 3 to read text data DT1 to DT4 of the image data D1 to D4 selected from searching.

In addition, the processor 5 instructs the video server 3 to read the encoded data D5 to DB of respective corresponding image data D1 to D4 on the basis of the result of search, display respective corresponding image data D1 to D4 on the basis of the encoded data D5 to D8 and the text data DT1 to DT4 on a monitor unit 7 respectively by dividing in such as the number of images, and display a part of text information on a liquid crystal display 8.

As a result, the operator can select the image data of corresponding image data D1 to D4 displayed on the monitor unit 7 and the liquid crystal display 8 and the desired image on the basis of the text information.

When a replaying instruction of the image data D1 to D4 selected as described above is inputted in the mode to prepare the editing list following to data searching and selection mode, the processor 5 instructs the video server 3 to read the encoded data D5 to D8 and the text data DT1 to DT4 of the image data D1 to D4 and display an image based on the encoded data D5 to D8 on the monitor unit 7 respectively by dividing in the number of the images, and display a part of the text information based on the text data DT1 to DT4 on the liquid crystal display 8.

As a result, the operator can register sequentially the desired part as clips respectively from images of the image data D1 to D4 by operating an operating portion 6 on the basis of the text information displayed on the liquid crystal display 8 to designate IN point and OUT point, watching respective images displayed on the monitor unit 7.

Also, the operator can prepare the editing list designating an editing content, such as a way and sequence of jointing respective clips registered by these steps, by using the processor 5. The data of the editing list (hereafter, the editing list data) prepared by such way is given from the processor 5 to an editing processing system (not illustrated) to execute actual editing processing on the basis of the editing list data in the editing processing system.

(2) Configuration of Video Cameras 2A to 2D of an Imaging Unit 2

Figure 2:
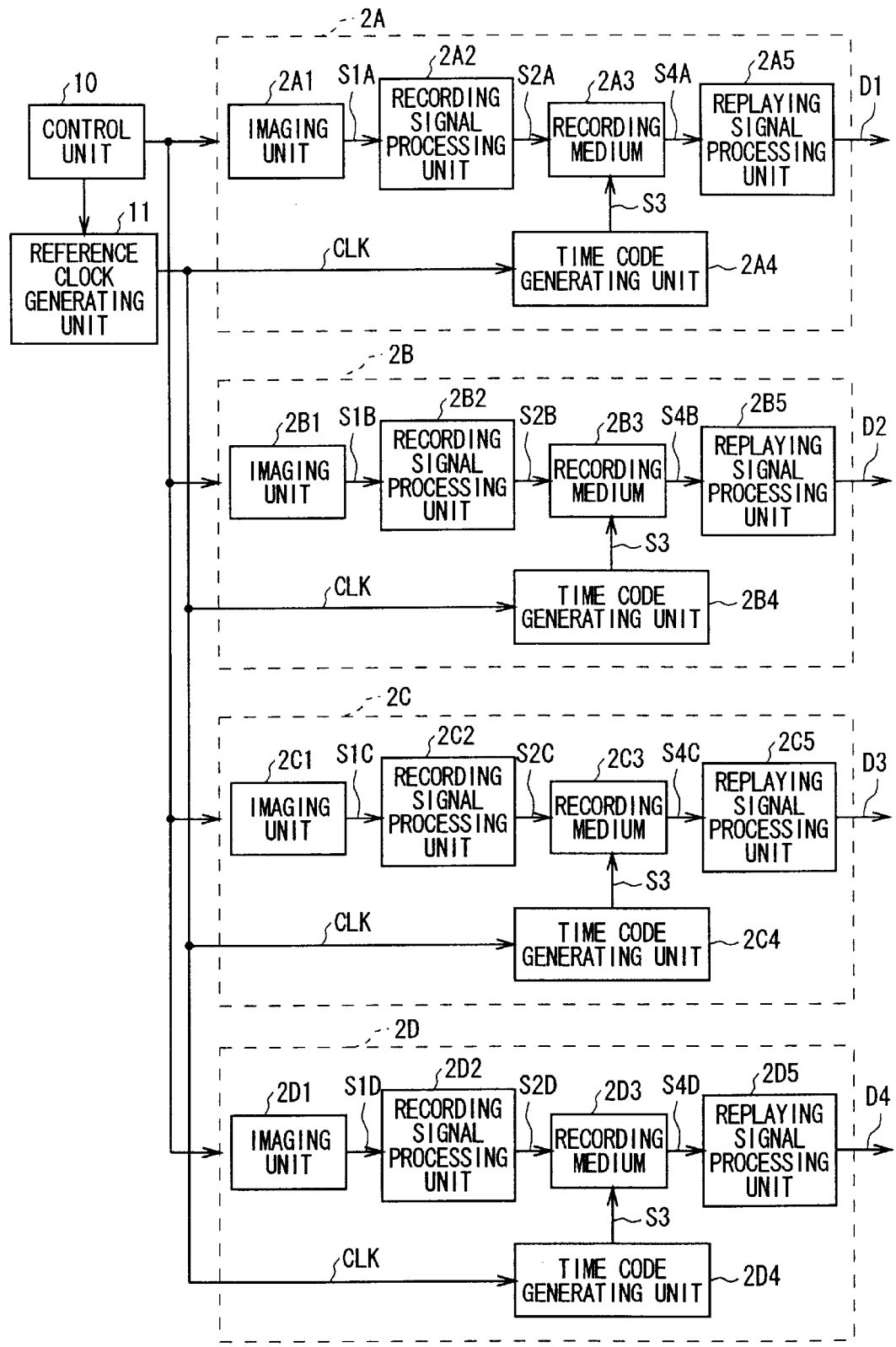
FIG. 2 is a block diagram showing the configuration of video cameras.

Practically, the video cameras 2A to 2D of an imaging unit 2 are respectively configured as shown such as in FIG. 2, and give images of imaging objects imaged by imaging units 2A1, 2B1, 2C1, and 2D1 on the basis of control of an external control unit 10 to corresponding recording signal processing units 2A2, 2B2, 2C2, and 2D2 as image signals S1A, S1B, S1C, and S1D.

After having carried out given signal processing for given image signals S1A to S1D, the recording signal processing units 2A2 to 2D2 give them to respectively corresponding recording media 2A3, 2B3, 2C3, and 2D3 such as a magnetic tape, a digital versatile disc (DVD), a hard disk as S2A, A2B, S2C, and S2D.

In this step, respective recording media 2A3 to 2D3 have received a time code signal S3 from corresponding time code generating units 2A4, 2B4, 2C4, and 2D4, respectively. The time code generating units 2A4, 2B4, 2C4, and 2D4 generate time codes respectively synchronized with respective video cameras 2A to 2D on the basis that a reference clock signal CLK is given from an external reference clock generating unit 11 by control of the external controlling unit 10.

For reference, in this example, respective time code generating units 2A4 to 2D4 comprise clocks. All these have been adjusted to the identical time by synchronizing on the basis of the reference clock signal CLK given from the reference clock generating unit.

By this, in the recording media 2A3 to 2D3, recording processing signals S2A to S2D given from the recording signal processing units 2A2 to 2D2 and a time code signal S3 given from the time code generating units 2A4 to 2D4 are integrally recorded as recording signals S4A, S4B, S4C, and S4D.

The recording media 2A3 to 2D3 read respectively recording signals S4A to S4D as needed on the basis of control of the external controlling unit 10 to give them to replaying signal processing units 2A5, 2B5, 2C5, and 2D5.

By this, the replaying signal processing units 2A5 to 2D5 carry out given signal processing for recording signals S4A to S4D respectively given to give image data D1 to D4 yielded to the video server 3 of the editing system 1.

By such steps, in respective video cameras 2A to 2D, images of imaging objects respectively imaged are integrally recorded with time code signal S3 respectively synchronized to be read and replayed as needed.

(3) Configuration of the Processor 5 of the Editing Device 4

Figure 3:
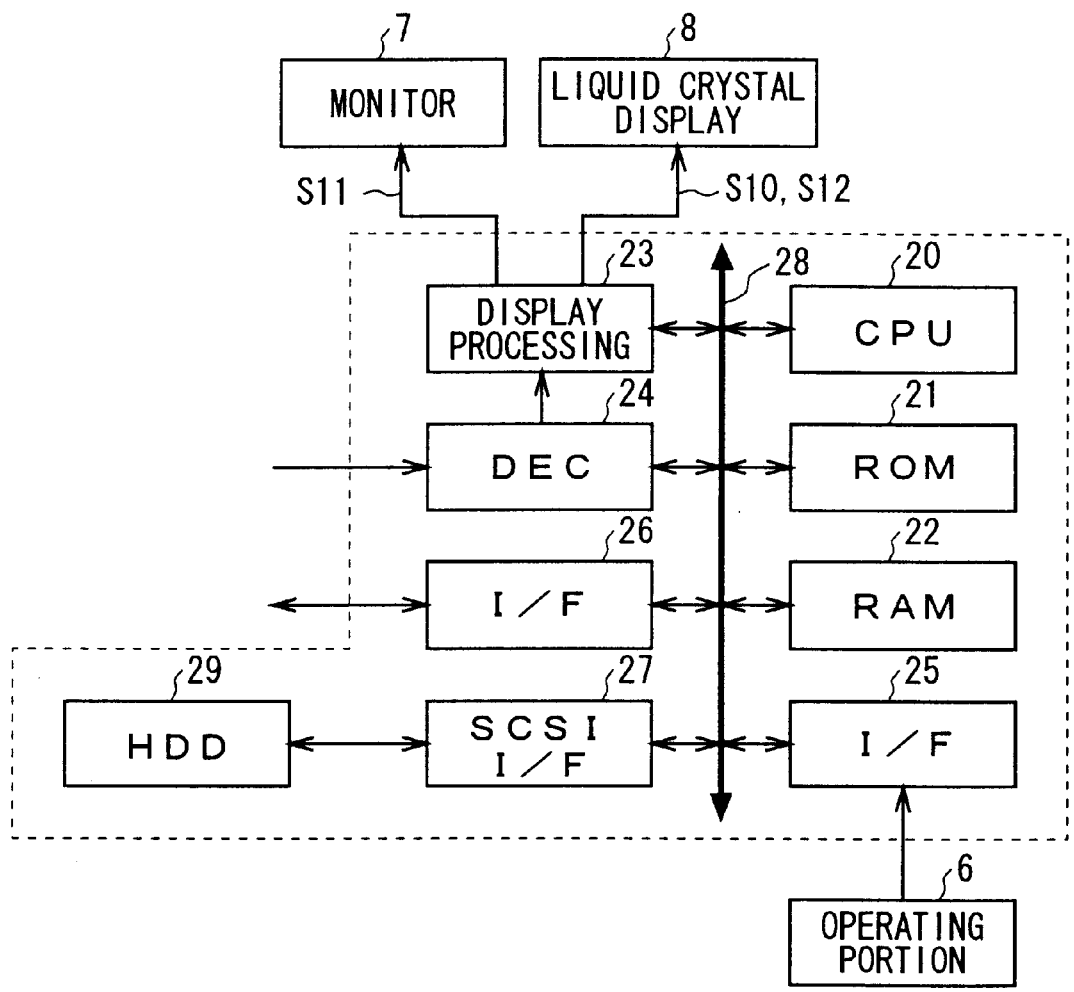
FIG. 3 is a block diagram showing the configuration of a processor.

In thus step, the processor 5 of the editing device 4, as shown in FIG. 3, is configured by connecting central processing unit (CPU) 20, read only memory (ROM) 21, random access memory (RAM) 22, a display processing circuit 23, a signal processing circuit 24, interface circuit 25 and 26 and small computer system interface (SCSI) interface circuit 27 through a CPU bus 28, connected to an operating portion 6 and the video server 3 respectively through respective interface circuit 25 and 26 , and connected to a hard disk device 29 through SCSI interface circuit 27.

In this case, the CPU 20 reads image data in the ROM 21 as needed on the basis of a program stored in the ROM 21, gives this to the liquid crystal display 8 as an image signal S10 through the display processing circuit 23, thereby displaying numerals and characters, which are inputted through a GUI screen 30 and the operating portion 6, on the liquid crystal display 8.

Further, the CPU 20 replays the encoded data D5 to D8 of necessary image data D1 to D4 and their text data DT1 to DT4 by accessing the video server 3 through the second interface circuit 26 as needed on the basis of a program stored in the ROM 21, when an executable instruction of a given processing is given through the first interface circuit 25 by operation of the operating portion 6.

Furthermore, the CPU 20 takes in the encoded data D5 to D8 and the text data DT1 to DT4 of the image data D1 to D4 replayed by the video server 3 through the signal processing circuit 24 and the second interface circuit 26 and decodes the encoded data D5 to D8 on the basis of such standard as MPEG2 in the signal processing circuit 24 to yield decoded data D9 to D12.

The CPU 20 displays images of corresponding image data D1 to D4 and text information corresponding thereto on the monitor 7 and the liquid crystal display 8 by giving these decoded data D9 to D12 and the text data DT1 to DT4 to the monitor 7 and the liquid crystal display 8 as respective image signals S11 and S12 through the display processing circuit 23.

The CPU 20 stores these decoded data D9 to D12 of the image data D1 to D4 yielded by such way and the corresponding text data DT1 to DT4 in the hard disk device 29 as needed through SCSI interface circuit 27, and reads these decoded data D9 to D12 of the image material and the corresponding text data DT1 to DT4 stored in the hard disk device 29 through SCSI interface circuit 27 as needed.

Figure 4:
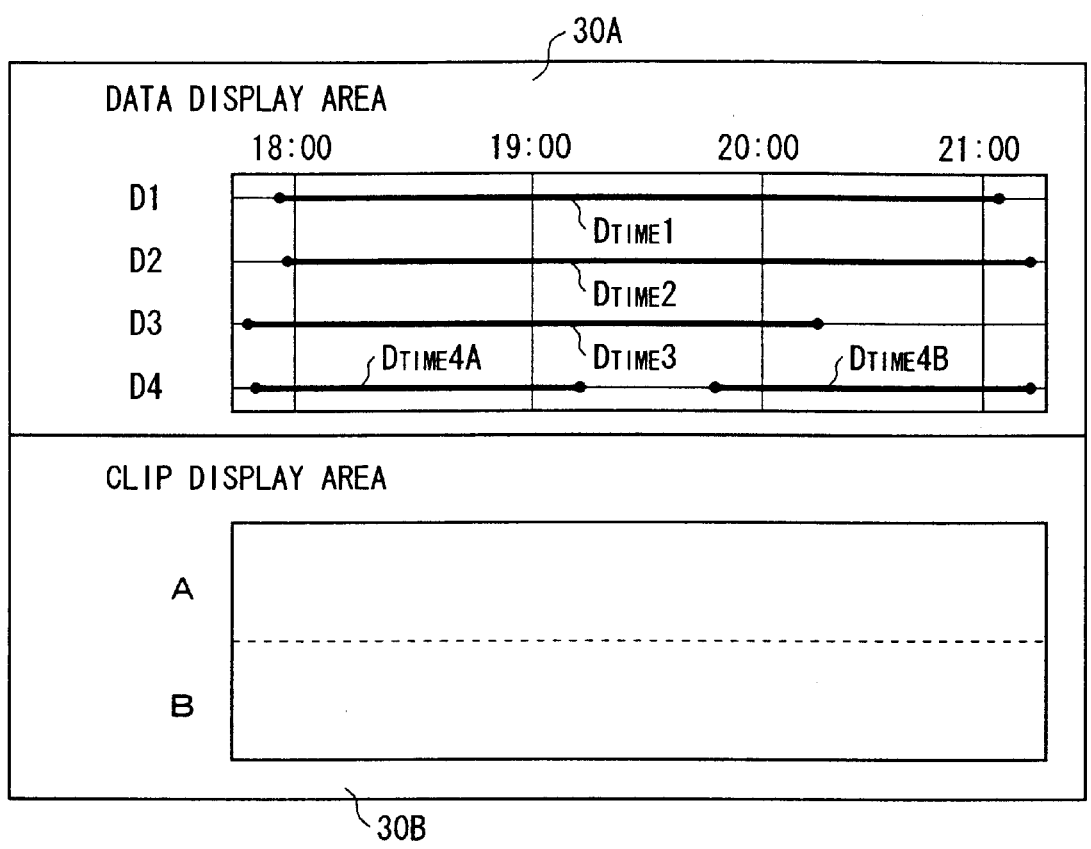
FIG. 4 is an outlined view showing the configuration of a GUI screen.

The text information displayed practically on the liquid crystal display 8 is, as shown in FIG. 4, configured by graphical user interface (GUI) screen 30 comprising a data displaying area 30A, in which an image content such as a total imaging time of the respective image data D1 to D4 on the basis of the text data DT1 to DT4 of the respective image data D1 to D4 selected by the operator is displayed in parallel respectively on the identical time base as time data $D_{TIME}1$ to $D_{TIME}4B$ composed of time lines based on a time code signal S3 respectively, and a clip displaying area 30B, in which the desired part of the respective image data D1 to D4 designated by the operator in this data displaying area 30A is displayed in the AB roll style which displays sequentially and alternately in A roll side and B roll side in parallel by using the given time lines respectively as clips.

For reference, the data displaying area 30A is time display based on the clock of the video cameras 2A to 2D, and therefore, in this embodiment shows the imaging time from about 18:00 to slightly past 21:00.

Figure 5A:
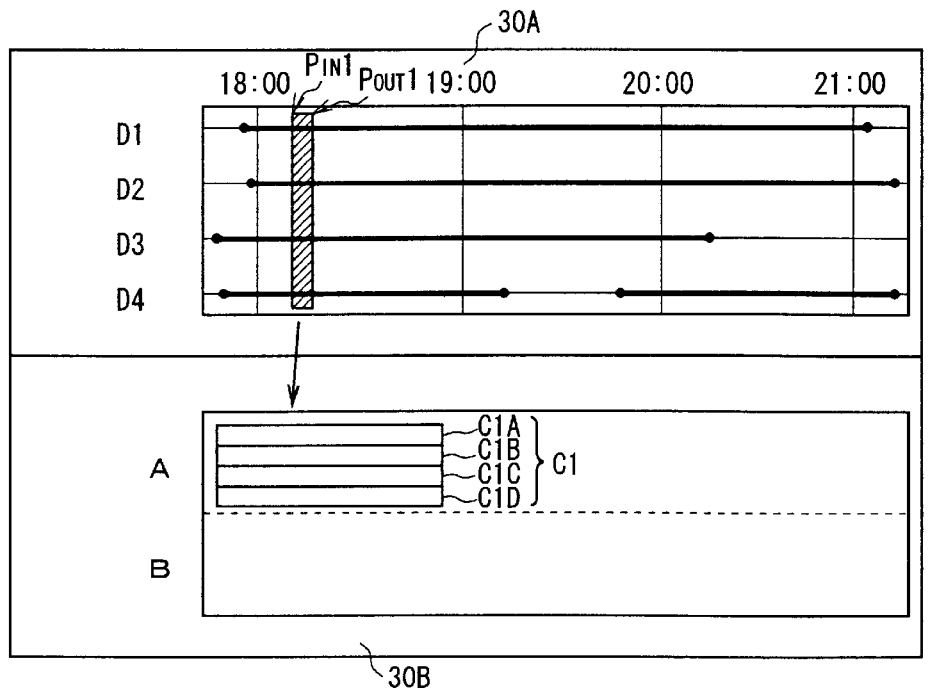
FIG. 5 is an outlined view showing the appearance of preparation of an editing list in the GUI screen.

Subsequently, in the preparation mode for the editing list, as shown in FIG. 5A, the operator designates an IN point $P_{IN}1$ and an OUT point $P_{OUT}1$ watching images of the respective image data D1 to D4 correspondingly displayed in a four-part split screen on the monitor 7 to extract images of a desired time zone as clip group C1 from the time data $D_{TIME}1$ to $D_{TIME}4B$ of the respective image data D1 to D4 displayed in the data displaying area 30A from about 18:00 to slightly past 21:00.

In this step, the area designated by the IN point $P_{IN}1$ and the OUT point $P_{OUT}1$ is displayed separately.

The clip group C1 extracted by these steps is displayed as clips C1A, C1B, C1C, and C1D by using the time line of a length corresponded to the time of the time data $D_{TIME}1$ to $D_{TIME}4B$ in A roll side of a clip displaying area 30B.

Figure 5B:
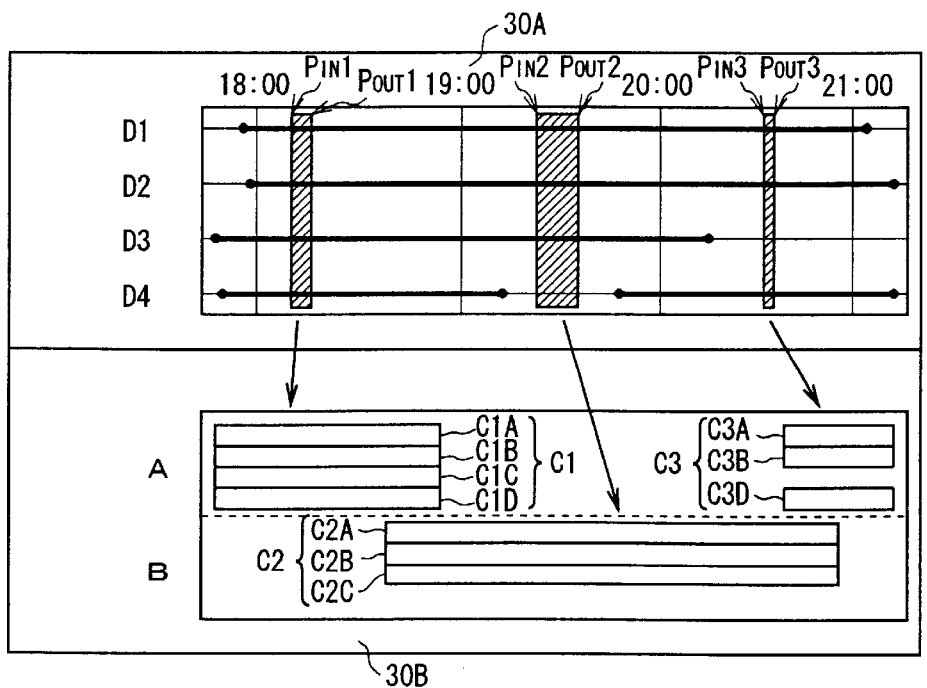

By repeating these steps sequentially, the operator, as shown in FIG. 5B, designates an IN point $P_{IN}2$ and $P_{IN}3$ and an OUT point $P_{OUT}2$ and $P_{OUT}3$ to extract images of a desired time zone as clip groups C2 and C3 from the time data $D_{TIME}1$ to $D_{TIME}4B$ displayed in the data displaying area 30A.

By these steps, these clip groups C2 and C3 are displayed sequentially and alternately as clips C2A to C2C and C3A, C3B, and C3D on B roll side and A roll side of a clip displaying area 30B.

In this step, the length of respective clips C1A to C3D of clip groups C1 to C3 displayed in the clip displaying area 30B respectively proportions to the time between the IN point $P_{IN}1$ and $P_{IN}3$ and the OUT point $P_{OUT}1$ and $P_{OUT}3$ designated in the data displaying area 30A, and is set longer for a given time (about 5 seconds) back and forth as joint margins for jointing.

Figure 6:
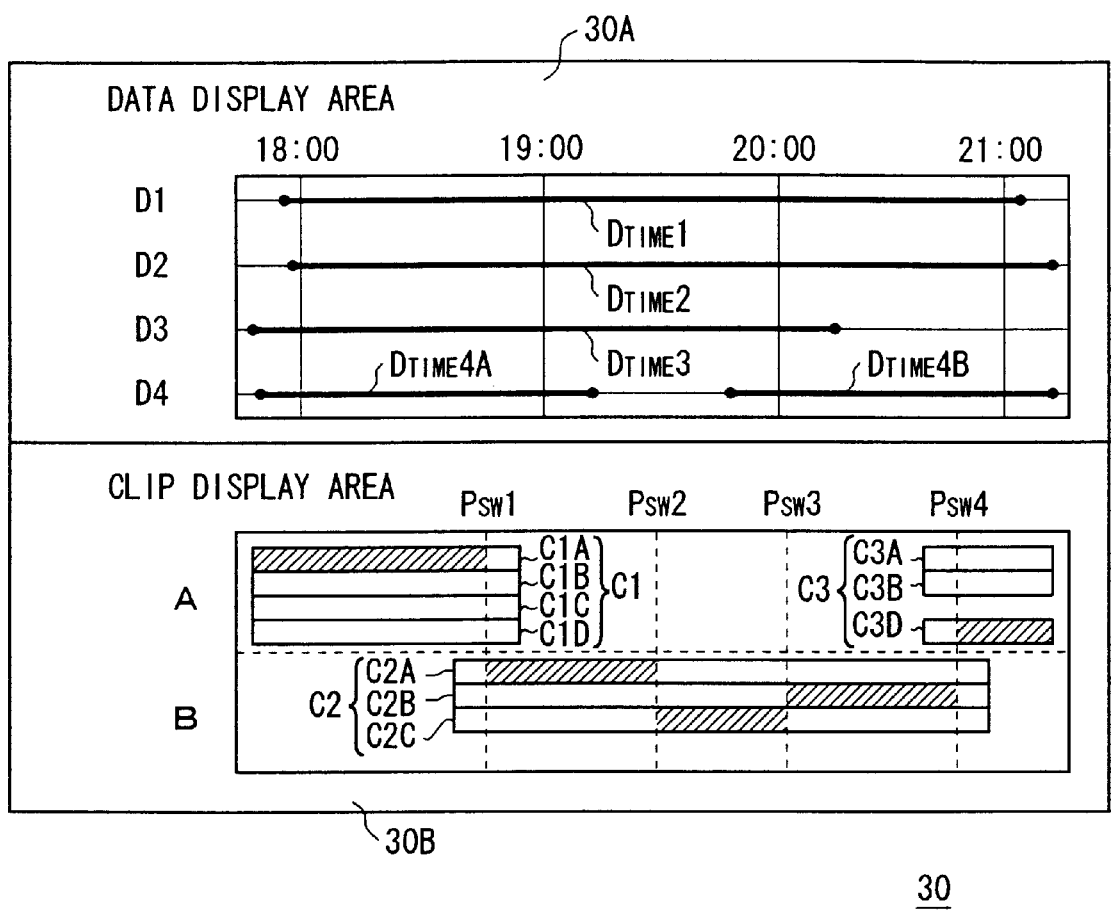
FIG. 6 is an outlined view showing the appearance of preparation of the editing list in the GUI screen.

Subsequently, as shown in FIG. 6, the operator selects desired images of the clips C1A to C3D from the respective clip group C1 to C3 for every the respective clip group C1 to C3 watching images of the clips C1A to C3D displayed on the monitor 7 corresponding to the respective clip group C1 to C3 jointed by arranging in a given alignment in the AB roll system in the clip displaying area 30B in order to designate the timing of switching the images by using switching points $P_{SW}1$ to $P_{SW}4$.

In this step, the clips C1A to C3D designated by the operator are displayed separately.

For reference, in this editing system 1, moving, adding, and deleting these switching points $P_{SW}1$ to $P_{SW}4$ in the clip groups C1 to C3 jointed allows easy edition keeping a time flow of the clip groups C1 to C3 jointed.

By these steps in the editing system 1, in extraction of the desired part from the image data D1 to D4 as the clip groups C1 to C3 after the operator selects the desired image data D1 to D4 from image data stored in the video server 3 using the GUI screen 30, a temporal correlation between the clip groups C1 to C3 to be extracted is easily understood because the image data D1 to D4 is arranged in parallel on the identical time base on the basis of the time code signal S3. In addition, the temporal timing between the clip groups C1 to C3 can be easily adjusted, because the clip groups C1 to C3 are synchronized on the basis of the time code signal S3.

(4) Processing Steps for Preparing the Editing List for the CPU 20

Figure 7:
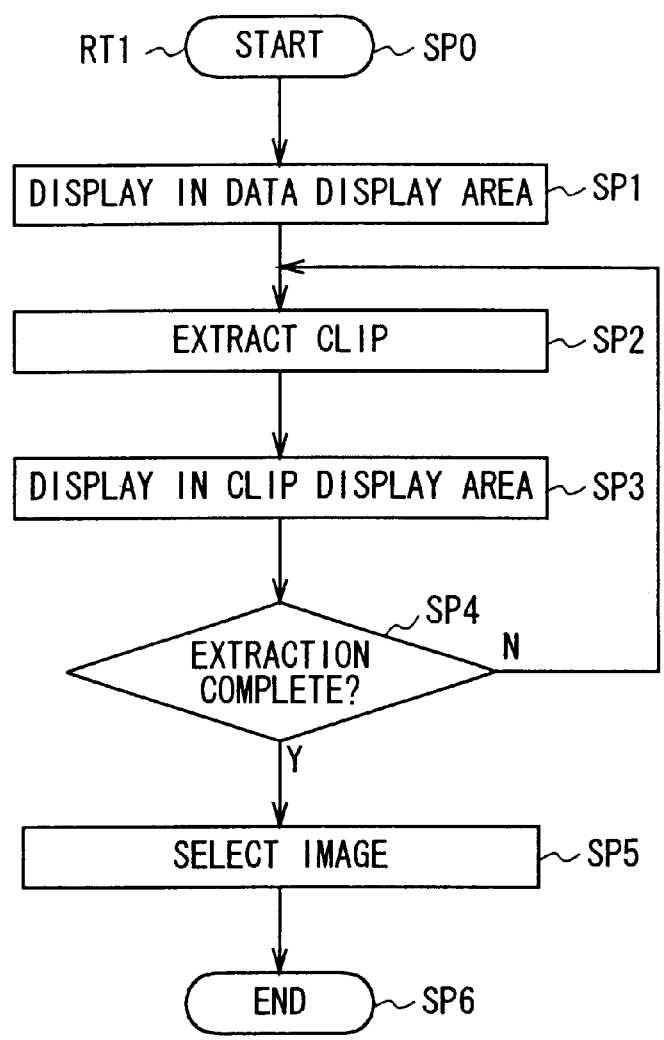
FIG. 7 is a flow chart showing steps of preparing process of the editing list.

Practically, herewith, the CPU 20 of the processor 5 executes the editing processing of the image data D1 to D4 described above according to a processing step RT1 for preparing the editing list shown in FIG. 7 in the mode for preparing the editing list.

When the desired image data D1 to D4 are designated from image data stored in the video server 3 by the operator to input replay instruction thereof, the CPU20 starts the processing step RT1 for preparing the editing list in a step SP0 and in the following step SP1, displays the necessary time for the image data D1 to D4 in the data displaying area 30A of the GUI screen 30 of the liquid crystal display 8 by synchronizing with the identical time base in parallel on the basis of the corresponding text data DT1 to DT4.

Subsequently, the CPU20 goes on to the next step SP2, and when an instruction designating a desired part of the image data D1 to D4 in the data displaying area 30A using the IN point $P_{IN}1$ and the OUT point $P_{OUT}1$ is inputted, extracts this as the clip group C1 and goes on to the following step SP3.

Next, the CPU20 displays the clip group C1 extracted in the step SP2 in the clip displaying area 30B as clips C1A to C1D by using corresponding time lines in the step SP3 and goes on to the step SP4 to decide to complete or not extraction of a clip from the image data D1 to D4 in the data displaying area 30A.

Next, the CPU20 returns to the step SP2 when a negative result is obtained by input of the designation instruction of the IN point $P_{IN}2$ and the OUT point $P_{OUT}2$ for extraction of clips by the operator in the step SP4, and in the following step SP4, repeats a loop of the steps SP2-SP3-SP 4 until a positive result is obtained, finally goes on to the next step SP5 when the positive result is obtained in the step SP4 by input of an instruction to complete extraction of the clip by the operator.

In this step, the CPU20 displays sequentially and alternately the clip group C1 to C3 extracted by repeating the loop of the steps SP2-SP3-SP 4 in the clip displaying area 30B from the A roll side in the AB roll system in order to joint the clip group C1 to C3 extracted in a given condition.

Next, when the instruction to select which image in the respective clip group C1 to C3 jointed by the operator in the step SP5 and to designate the timing of switching this is inputted, the CPU20 puts the switching points $P_{SW}1$ to $P_{SW}4$ in the point designated in the respective clip group C1 to C3 to categorize for each area as well as to point to corresponding clips C1A to C1D corresponding to images designated in the area.

Subsequently, the CPU20 goes on to the following step SP6 to complete the processing step RT1 for preparing the editing list.

(5) Operation and Effect of the Present Embodiment

According to the configuration described above, in the editing system 1, one imaging object is imaged by adding the time code signal S3 respectively synchronized from various angles by using a plurality of video cameras 2A to 2D.

The editing system 1 in the mode for preparing the editing list converts the image data D1 to D4 as the result of imaging to the time data $D_{TIME}1$ to $D_{TIME}4B$ on the basis of the time code signal S3 respectively in order to display in the data displaying area 30A of the GUI screen 30 in parallel in the identical time base.

In the editing system 1, the clips C1A to C1D, which are extracted from the time data $D_{TIME}1$ to $D_{TIME}4B$ displayed in the data displaying area 30A for every image corresponding to the desired part which is designated sequentially on the time base, are displayed in the clip displaying area 30B in the AB roll system as the clip group C1 to C3 for every clips C1A to C3D corresponding to the desired part in order to join them.

Therefore, in the editing system 1, the temporal correlation of the respective clips C1A to C3D is easily understood and also jointing borders between the clip groups C1 to C3 to be jointed can become clear.

According to configuration described above, in the mode of preparing the editing list in the editing system 1, respective images based on a plurality of imaging result is converted respectively to time lines in a reference of the time code added synchronizing with the respective images on the identical time base in order to display in parallel to the data displaying area 30A. By this, the temporal correlation of the respective clips, which are extracted for every image of the desired part, which is sequentially designated on the time base from the respective images, can be easily understood. Thus, the editing system 1, in which the efficiency of editing work can be greatly improved, can be realized.

(6) Other Embodiments

In the embodiments described above, a case of an application of the present invention to the editing system 1 has been described. However, the present invention is not restricted to this, but can be widely applied to other various editing devices in which the temporal correlation between the clips selected from the image data can be easily understood.

Further in embodiments described above, a case where the image data D1 to D4 imaged by using the video cameras 2A to 2D as image data to be stored in the video server 3 has been described. However, the present invention is not restricted to this. Various other types of image data, as long as they are a plurality of image data imaged on the basis of respectively synchronized time code, can be widely applied as the image data to be stored in the video server 3.

Furthermore, in the embodiments described above, a case, where the data displaying area 30A of the GUI screen 30 and the clip displaying area 30B are displayed as shown in FIG. 4, has been described. However, the present invention is not restricted to this, but various other displaying methods can be widely applied as the displaying method of the GUI screen 30.

Furthermore, in the embodiments described above, a case, where divided displaying is carried out for the number of images based on the image data D1 to D4 selected from the image data D1 to D4, which are stored in the video server 3 by the operator, as the displaying method for images in the monitor 7, has been described. However, the present invention is not restricted to this, but various other displaying methods can be applied as the displaying method for images of image data D1 to D4. For example, it is possible to use the monitor 7 for the number of images selected from the image data D1 to D4 to display the images corresponding to each of them.

Further, in the embodiments described above, a case, where a clock is used for the time code generating unit 2A4 to 2D4 of the video cameras 2A to 2D has been described. However, the present invention is not restricted to this. Various other types can be widely applied as the time code generating unit 2A4 to 2D4, as long as they generate time codes synchronizing respectively based on the reference clock signal CLK.

As described above, according to the present invention, the editing device comprises the first displaying means displaying images based on a plurality of imaging results through converting to time lines with a standard of time codes added synchronizing with respective images on an identical time base respectively, the second displaying means displaying respective images corresponding to time codes designated by the time bases among the respective time lines displayed, the third displaying means displaying an image of a desired part sequentially designated, on the time bases, from the respective image displayed, as a clip respectively, wherein the third displaying means selects only the desired clip from clips corresponding to the respective imaging results configuring the desired parts designated. Thus, the temporal correlation between the clips extracted for every image of the desired part, which is designated sequentially from respective images on the time base can be easily understood. Thus, the editing system, in which the efficiency of editing work can be greatly improved, can be realized.

In addition, according to the present invention, the editing method comprises a first step displaying respective images based on a plurality of imaging results through converting to time lines with a standard of time codes added synchronizing with respective images on an identical time base respectively, a second step displaying respective images corresponding to time codes designated by the time bases among the respective time lines displayed, a third step displaying images of a desired part sequentially designated, on the time bases, from the respective displayed images as clips respectively, and a fourth step displaying only a clip selected from clips corresponding to the respective imaging results composing the designated desired parts. Thus, the temporal correlation between the clips extracted for every image of the desired part, which is designated sequentially from respective images on the time base can be easily understood. Thus, the editing system, in which the efficiency of editing work can be greatly improved, can be realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An editing device comprising:

image editing means for displaying image data from a plurality of sources on the basis of time codes of said image data on an identical time base;

first selecting means for selecting image data corresponding to a desired part of the time base;

clip displaying means for displaying selected image data as clip groups; each clip group being displayed in turn on alternating roll sides of a clip displaying area; and second selecting means for sequentially selecting desired clips from said clip groups; each clip corresponding to image data from one of said plurality of sources.

2. The editing device according to claim 1, wherein each clip group comprises image data from all of said plurality of sources having time codes corresponding to the desired part of the time base.

3. The editing device according to claim 1, wherein said image data from said plurality of sources is information corresponding to video data of a scene taken by plural cameras from different angles.

4. The editing device according to claim 1, wherein said first selecting means selects an in-point and an out-point for each clip group.

5. The editing device according to claim 1, further comprising an edit list generating means for generating an edit list on the basis of the desired clips selected by said second selecting means.

6. The editing device according to claim 1, further comprising a monitor for displaying video data corresponding to the image data.

* * * * *

UNITED STATES PATENT AND TRADEMARK OFFICE
CERTIFICATE OF CORRECTION

PATENT NO. : 6,618,058 B1 Page 1 of 1
DATED : September 9, 2003
INVENTOR(S) : Shigeya Yasui It is certified that error appears in the above-identified patent and that said Letters Patent is hereby corrected as shown below:

<u>Title page,</u>
Item [*] Notice, reads "Subject to any disclaimer, the term of this patent is extended or adjusted under 35 U.S.C. 154(b) by 0 days." should read -- Subject to any disclaimer, the term of this patent is extended or adjusted under 35 U.S.C. 154(b) by 388 days. --

Signed and Sealed this

Tenth Day of February, 2004

JON W. DUDAS
*Acting Director of the United States Patent and Trademark Office*